United States Patent Office 3,268,431
Patented August 23, 1966

3,268,431
METHOD OF OBTAINING IN ONE OPERATION A SOLUTION OF PERACETIC ACID AND OTHER ORGANIC PERACIDS
Tadeusz Urbanski, 22 Nowowiejska St.; Juliusz Hackel, 23 Zwyciestwa St., Rembertow; Rudolf Kuboszek, 14 Londyska St., Saska Kepa; and Wieslaw Kutkiewicz, 72 Przyjazn St., Jelonki, all of Warsaw, Poland
No Drawing. Filed Oct. 18, 1965, Ser. No. 497,545
Claims priority, application Poland, July 29, 1961, 97,055
9 Claims. (Cl. 204—158)

This application is a continuation-in-part of copending application Serial No. 207,381, filed July 3, 1962 (abandoned since the filing of the present application).

The known method of obtaining peracetic acid and other organic peracids consists either in oxidizing organic acids or their anhydrides with hydrogen peroxide, or in controlled decomposition of the peroxide obtained by oxidation of the corresponding aldehyde.

The method consisting in the application of hydrogen peroxide gives peracetic acid in the form of a solution containing considerable quantities of acetic acid and water and also unused hydrogen peroxide and sulfuric acid. The presence of water and sulfuric acid in the product diminishes its value and limits its application.

Another known method of obtaining aliphatic peracids (the two-stage method) consists in obtaining, in the first stage, an intermediate peroxy compound

(e.g. acetaldehyde monoperacetate), which is unstable and explosive, by low temperature oxidation of acetaldehyde or other lower aliphatic aldehydes in the presence of a catalytic agent such as ozone, or by irradiation with ultraviolet light.

In the second stage, the peroxy compound thus obtained is decomposed into aldehyde and peracid. This constitutes another separate process.

Obtaining peracids from corresponding aldehydes by the two-stage method is troublesome and creates serious technical problems.

According to the existing views, it is impossible to obtain aliphatic peracids directly by oxidation of corresponding aldehydes. These views are expressed in previously published papers and patents, in which the authors state that low temperature oxidation in the liquid phase ceases when two molecules of aldehyde become reacted with one molecule of oxygen. The ratio of the number of moles of oxygen to the number of moles of aldehyde entering into the reaction is, therefore, equal to 0.5. See B. Phillips, F. C. Frostick, P. S. Starcher, Journal of the American Chemical Society, 79, 5982 (1957). In the case of the oxidation of acetaldehyde, this corresponds stoichiometrically to CH₃COOOH·CH₃CHO (acetaldehyde monoperacetate). As results from the investigations carried out by Phillips et al., acetaldehyde monoperacetate does not undergo further oxidation.

According to the generally accepted views, the initial product of aldehyde oxidation is peracid, which reacts with the aldehyde to give the peracid-aldehyde addition product, RCOOOH·RCHO. Between the peracid, aldehyde and the peracid-aldehyde addition products exists an equilibrium [C. E. H. Bawn, J. B. Williamson, Trans. Faraday Soc., 47, 721 (1951)] and this causes the reaction mass to contain all these components.

The reaction mass contains also an acid formed from the unstable peroxidic compound RCOOOH·RCHO.

The over-all process can be represented by the following scheme:

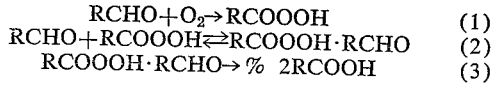

According to the present invention, the process of low temperature oxidation of a corresponding aliphatic aldehyde in the liquid phase leads directly to a peracid solution.

Investigation of the rates of reactions (1) and (2) wherein R is lower alkyl, e.g., CH₃, C₂H₅ and C₃H₇ has proven that, in spite of the existing contrary opinions, the aldehyde oxidation in the liquid phase in a solution of an inert organic solvent (e.g. acetone or ethyl acetate) can be carried out in such a way that the ratio of the number of moles of the reacting oxygen to the number of moles of aldehyde participating in the reaction exceeds 0.5 and can reach 0.75.

This means that the product mixture contains more peracid than needed for quantitative conversion with the present aldehyde to an acid by way of peroxide RCOOO·RCHO, according to Equations 2 and 3. In the present description the excess of peracid is called "free peracid."

It is possible to obtain conversion degrees corresponding to the oxygen-to-aldehyde molar ratios higher than 0.5 if reaction (1) is carried out at a rate much higher than that of reaction (2).

This requires adherence to the following conditions:
(1) The reaction mass should be kept in turbulent motion, because reaction (1) proceeds at the liquid-gas interface and diffusiveness considerably influences the reaction rate.

The process should be carried out in such a way as to introduce the oxidizing agent, such as oxygen or a mixture of oxygen and ozone, into the tank at a rate at least twice as high as the absorption rate.

(2) In the case of oxidation with pure oxygen (or with oxygen-containing gases), a high-intensity ultraviolet irradiation should be used; in the case of oxidation with a mixture of oxygen with ozone, an appropriate concentration of ozone in oxygen, not lower than 1% by weight, should be used—the rate of reaction (1) depends both upon the ultraviolet radiation intensity and ozone concentration in oxygen. Simultaneous application of the two accelerating agents gives better results.

(3) The increase of the rate of reaction (1) with increase in aldehyde concentration is, owing to diffusion, lower than that of reaction (2), and therefore diluted solutions of aldehyde should be used, with initial concentrations of aldehyde not exceeding, in general, 50% by weight.

Even more dilute solutions are recommended for reasons of security as well as owing to the fact that the necessity of obtaining the maximum rate of reaction (1) creates serious problems of dissipating the reaction heat. Preferable initial concentrations of aldehyde are approximately from 10 to 35% by weight of the solvent.

(4) A rise in the temperature causes an increase in the rate of reaction (2) as compared with reaction (1); a decrease of temperature is, therefore, advantageous for the transformation according to reaction (1) with yields of free peracid.

Fairly good results are obtained at temperatures ranging from −10 to +3° C., a further decrease of the temperature giving only slight improvement of the yield. A further rise of temperature, on the other hand, decreases the yield. At temperatures above +20° C., a vigorous reaction may occur with formation of acid according to Equation 3. Therefore the temperature of the process of oxidation of aldehyde in the instant process to peracid should not exceed +20° C.

(5) Esters of lower acids and lower aliphatic alcohols or acetone are used as solvents.

According to the present invention, an anhydrous solution of aliphatic peracid containing 2 to 4 carbon atoms is prepared in a one-step process using only one operation. The peracid is obtained by oxidation of the solution of a corresponding aliphatic aldehyde at concentrations of up to 50% by weight. Preferable concentrations of the aldehyde are approximately from 10 to 35% by weight. The oxidizing agent is molecular oxygen used in excess. Ozone in a concentration of at least 1% by weight of oxygen and/or irradiation with ultraviolet light are applied as accelerating agents.

According to the invention, a method is given which makes possible the preparation of anhydrous solutions containing up to 30% by weight of free lower aliphatic peracids of 2 to 4 carbon atoms in a simple and inexpensive apparatus (e.g. bubbler) and with considerable economy in the process. The peracid solutions obtained by this method enter into the epoxidation reaction with compounds which fail to form epoxy derivatives either with aqueous peracetic acid or with peroxy compounds such as acetaldehyde monoperacetate. The yield of the epoxidation reaction exceeds 90% calculated on the free peracid used.

The following examples are illustrative of the preparation of peracetic acid in ethyl acetate. With acetone or esters of lower aliphatic acids and alcohols as solvents, analogous results are obtained. With acetaldehyde replaced by propionaldehyde or butyraldehyde, perpropionic or perbutyric acid is obtained in the same manner and in approximately the same yield. Concentrations of peracids given in the following examples refer to the free peracid.

*Example 1*

A 33% by weight acetaldehyde solution in ethyl acetate, 180 grams (g.), was subjected to oxidation with cylinder oxygen in a bubbler. Oxygen was used in about 100% excess over the stoichiometric quantity. The reaction mass was kept in turbulent motion and the oxygen feeding rate was regulated in such a way that it was always at least twice as high as the absorption rate. The temperature in the reactor was held at 0° C. to 3° C. The reaction mass was irradiated with three high-pressure mercury vapor lamps (total power about 300 watts). After three hours, the reaction solution contained 12.5% of free peracetic acid.

*Example 2*

Under the conditions of Example 1, but without irradiation and with ozonized 8% oxygen as oxidant, a solution containing 16.6% of free peracetic acid was obtained in 3 hours.

*Example 3*

A 50% by weight acetaldehyde solution in ethyl acetate, 180 g., was subjected to oxidation by ozonized oxygen in such a manner as in Example 2. The feeding rate of the ozonized oxygen-containing 1.8% by weight of ozone was 3 times as high as the absorption rate. The temperature in the reactor was held at −30° C. to −28° C.

After three hours a solution was obtained containing 30.8% of free peracetic acid.

*Example 4*

A 25% by weight propionaldehyde solution in ethyl acetate, 180 g., was subjected to oxidation in the apparatus as in Examples 1 and 2. The feeding rate of the ozonized oxygen, containing 1.8% by weight of ozone, was 3 times as high as the absorption rate. The temperature in the reactor was held at −2° C. to +2° C. After three hours a solution was obtained containing 16.1% of free perpropionic acid.

What is claimed is:

1. In the process of preparing organic peracids of 2 to 4 carbon atoms by oxidizing the corresponding aldehyde, the improvement of carrying out the preparation in a one-step process by oxidizing a dilute solution of the aldehyde in an inert organic solvent with an excess of an oxidizing agent selected from the class consisting of oxygen and air together with a promoting agent consisting of 1 percent by weight of ozone, the reaction mass being maintained in turbulent motion and at a temperature of from about −30° C. to about 20° C. during the oxidation.

2. In the process of preparing organic peracids of 2 to 4 carbon atoms by oxidizing the corresponding aldehyde, the improvement of carrying out the preparation in a one-step process by oxidizing a dilute solution of the aldehyde in an inert organic solvent with an excess of an oxidizing agent selected from the class consisting of oxygen and air, the reaction mass being subjected to intense ultraviolet irradiation, as oxidation promoting agent, and being maintained in turbulent motion and at a temperature of from about −30° C. to about 20° C. during the oxidation.

3. In the process of preparing organic peracids of 2 to 4 carbon atoms by oxidizing the corresponding aldehyde, the improvement of carrying out the preparation in a one-step process by oxidizing a dilute solution of the aldehyde in an inert organic solvent with an excess of an oxidizing agent selected from the class consisting of oxygen and air together with a promoting agent consisting of 1 percent by weight of ozone, the reaction mass being subjected to intense ultraviolet irradiation, as auxiliary oxidation promoting agent, and being maintained in turbulent motion and at a temperature of from about −30° C. to about 20° C. during the oxidation.

4. A process as in claim 2 wherein the inert organic solvent is a member selected from the group consisting of esters of lower aliphatic acids and lower aliphatic alcohols.

5. A process as in claim 3 wherein the inert organic solvent is a member selected from the group consisting of esters of lower aliphatic acids and lower aliphatic alcohols.

6. A process as in claim 2 wherein the solvent is acetone.

7. A process as in claim 3 wherein the solvent is acetone.

8. A process as in claim 1 wherein the inert organic solvent is a member selected from the group consisting of esters of lower aliphatic acids and lower aliphatic alcohols.

9. A method as in claim 1 wherein the solvent employed is acetone.

References Cited by the Examiner

UNITED STATES PATENTS 2,804,473    8/1957    Phillips et al. _____ 204—158 X

JOHN H. MACK, *Primary Examiner.*

HOWARD S. WILLIAMS, *Examiner.*